J. Mayer,
Barbers Basin and Stand.

No. 49,539.      Patented Aug. 22, 1865.

Witnesses:
Benj Morrison
G. C. Hopp

Inventor:
John Mayer

N. PETERS, PHOTO-LITHOGRAPHER, WASHINGTON, D.C.

United States Patent Office.

JOHN MAYER, OF PHILADELPHIA, PENNSYLVANIA.

IMPROVEMENT IN COMBINED ROTATING FOUNTAIN AND SEAT FOR BARBERS' SHOPS.

Specification forming part of Letters Patent No. 49,539, dated August 22, 1865.

*To all whom it may concern:*

Be it known that I, JOHN MAYER, of the city of Philadelphia, in the State of Pennsylvania, have invented a new and useful Improvement in the Fountain and Seats for Barbers and Hair-Dressers; and I do hereby declare that the following is a full, clear, and exact description of the construction and operation of the same, reference being had to the accompanying drawings, making a part of this specification, in which—

Figure 1:
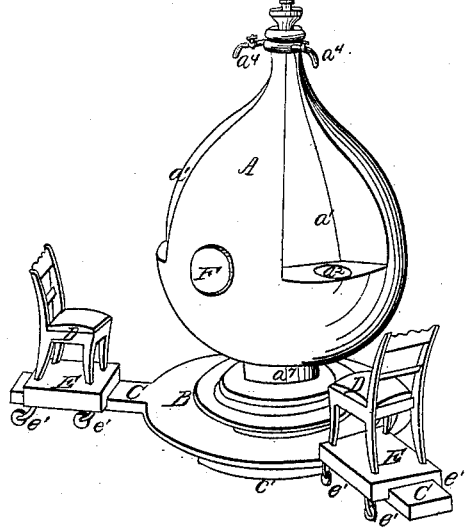
Figure 2:
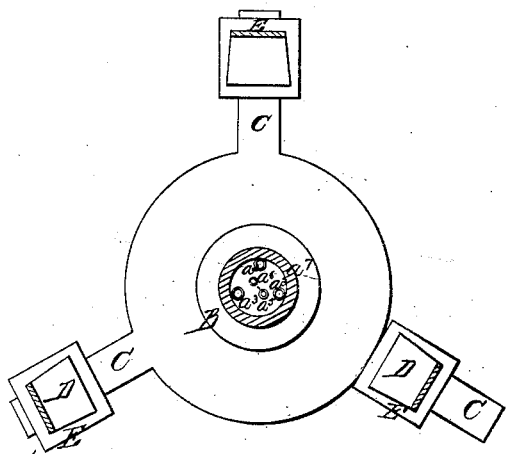

Figure 1 is a perspective view of the said improved fountain and seats, and Fig. 2 a horizontal sectional representation of the seats and their carriers applied to the fountain, like letters of reference indicating the same parts when in both figures.

In barbers' shops it has heretofore been the practice—from necessity arising in the distant location of the fountains—in shampooing and washing the head and hair, that the subject rise from the shaving and hair-cutting seat and walk, with the towel about his neck, to another part of the shop to receive the ablutions necessary and preparatory to the final dressing of the hair—a movement which is objectionable and inconvenient both to the operator and to the subject; and it is the object of my invention to avoid this objectionable and inconvenient movement of the parties from place to place, and to afford better facilities for the operation.

It consists, substantially as hereinafter described and specified, of a fixed central fountain or isolated stand, provided with recesses around in its outer side, containing water-basins and provided with warm and cold water spouts and waste-pipes attached, so that it can be approached and used on all sides at the same time; and also in the combined arrangement of a stationary central fountain, having warm and cold water spouts and basins, with a horizontally-rotating platform having radial arms, upon or in connection with which the seats are made to be easily moved, with their occupants, toward and from the fountain, and also around it as a center, as the different operations of the barber or hair-dresser may require.

In the drawings, A is the fountain; B, the platform; C C C, the radial arms of the platform B, and D D D the respective seats.

The fountain A is in this instance made in the general form of an inverted top, but has three capacious open recesses, $a'$ $a'$, each provided with a basin, $a^2$, in its bottom, and corresponding waste-pipes, $a^3$, and also with a water-supply cock, $a^4$, at its upper end, two of which latter connect with a cold-water pipe, $a^5$, and one with a warm-water pipe, $a^6$, the said pipes passing down through the hollow fountain A, and also through its support or the floor of the room.

The platform B and arms C C C are connected rigidly together and rest upon a collar-piece, C', through the center of which and of the platform B the hollow supporting-stem $a^7$ of the fountain passes, and serves as a pivot around which the platform can be rotated horizontally in either direction, the said stem $a^7$ being fixed in the floor of the room.

The seats D are each fixed securely upon a small square platform, E, secured so that it will slide easily backward and forward while in connection with its respective arm C, its weight and that of its occupant being supported mainly by four casters, $e'$ $e'$ $e'$ $e'$, which roll directly upon the floor of the room.

A mirror, F, may be attached to the fountain, between each of the recesses $a'$, if desired.

Operation: The person to be operated upon is placed in one of the seats D, and, if desired, opposite one of the mirrors F, and after the percussive part of the shampooing operation is completed the platform B and seat D, with its occupant, are moved together around the fountain A until the occupant of the seat is brought opposite to one of the basins for warm water, when the small platform E, supporting the seat and its occupant, is moved up close to the fountain, thus admitting of the application of warm water from the cock above directly to the head of the subject, who leans over the basin for the purpose, and subsequently, by giving a short rotary movement to the platform B, the occupant of the seat is brought round to the basin for cold water and the washing part of the operation completed, when the seat and occupant are together moved back to their first position, all without any necessity for his leaving the seat.

Having thus fully described my improvement, what I claim as new therein, and desire to secure by Letters Patent, is—

1. The fixed central fountain or isolated stand, A, the same being constructed substantially in the inverted-top form shown, and also provided with the recesses $a'$, basins $a^2$, water-supply spouts $a^4$, connecting with supply-pipes passing up through the stand to the same, and the waste-pipes passing down through the stand from the said basins, all as described and set forth, for the purposes specified.

2. The combined arrangement of a stationary central fountain, A, with a rotatory platform, B, provided with radially-moving seats D, the whole being constructed so as to operate together, substantially in the manner described and set forth, for the purposes specified.

JOHN MAYER.

Witnesses:
BENJ. MORISON,
G. C. KOPP.